(12) United States Patent
Pettigrew et al.

(10) Patent No.: US 8,375,237 B2
(45) Date of Patent: Feb. 12, 2013

(54) SYSTEMS AND METHODS FOR SYNCHRONIZATION OF AN EXTERNAL CONTROL SYSTEM WITH FIELDBUS DEVICES

(75) Inventors: William Robert Pettigrew, Blacksburg, VA (US); Justin Brandon Chong, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 470 days.

(21) Appl. No.: 12/764,498

(22) Filed: Apr. 21, 2010

(65) Prior Publication Data

US 2011/0264241 A1   Oct. 27, 2011

(51) Int. Cl.
*G06F 1/12* (2006.01)
*G05B 11/01* (2006.01)

(52) U.S. Cl. ............................ 713/400; 713/375; 700/14

(58) Field of Classification Search ................. 713/400, 713/375
See application file for complete search history.

(56) References Cited

U.S. PATENT DOCUMENTS 7,012,980 B2    3/2006  Franke et al.

*Primary Examiner* — Suresh Suryawanshi
(74) *Attorney, Agent, or Firm* — Sutherland Asbill & Brennan LLP

(57) ABSTRACT

Systems and methods for synchronization of an external control system with Fieldbus devices are described. A message including timing information for at least one Fieldbus device in direct or indirect communication with a controller may be received by the controller. Based upon information included in the received message, the controller may determine a start time for a current operation cycle of the at least one Fieldbus device. The controller may then utilize the start time and a duration of the current operation cycle to determine a specific time at which the controller will execute control functionality for the at least one Fieldbus device such that a control message output by the controller will be received by the at least one Fieldbus device within the current operation cycle.

20 Claims, 3 Drawing Sheets

SYSTEMS AND METHODS FOR SYNCHRONIZATION OF AN EXTERNAL CONTROL SYSTEM WITH FIELDBUS DEVICES

FIELD OF THE INVENTION

Embodiments of the invention relate generally to control systems and more specifically to the synchronization of Fieldbus devices with an external control system.

BACKGROUND OF THE INVENTION

Control systems are utilized in a wide variety of different applications. For example, control systems are utilized in conjunction with power generating devices, in power plants, and/or in process plants. A control system typically includes a central controller in communication with other components of the control system, for example, sensors, measurement devices, valves, etc. The central controller typically communicates with the other components via suitable network communications.

With the development and adoption of the Foundation Fieldbus standard, Fieldbus devices have been incorporated into control systems. Typically, the Fieldbus devices are configured to perform their standard operations within a macrocyle or other operation cycle. The operation cycle of a Fieldbus device is often much greater than an operation cycle of an external controller, such as a central controller in a power plant. Given this asynchronous operation, timing discrepancies may exist between the controller and the Fieldbus devices. Additionally, communications and/or instructions output by the controller for a Fieldbus device may be received as much as two macrocycles behind the cycle in which operating data was provided to the controller by the Fieldbus device. Accordingly, improved systems and methods for synchronization of Fieldbus devices with an external controller or an external control system would be desirable.

BRIEF DESCRIPTION OF THE INVENTION

Some or all of the above needs and/or problems may be addressed by certain embodiments of the invention. Embodiments of the invention may include systems and methods for the synchronization of Fieldbus devices with an external control system. According to one embodiment of the invention, there is disclosed a method for synchronizing control of Fieldbus devices. A controller that includes one or more computers may receive a message that includes timing information for at least one Fieldbus device in direct or indirect communication with the controller. Based upon information included in the received message, the controller may determine a start time for a current operation cycle of the at least one Fieldbus device. Based upon the start time and a duration of the current operation cycle, the controller may determine a specific time at which the controller will execute control functionality for the at least one Fieldbus device such that a control message output by the controller will be received by the at least one Fieldbus device within the current operation cycle.

According to another embodiment of the invention, there is disclosed a control system. The control system may include at least one memory and at least one processor. The at least one memory may be configured to store computer-executable instructions. The at least one processor may be configured to access the at least one memory and execute the computer-executable instructions to: receive a message including timing information for at least one Fieldbus device in direct or indirect communication with the processor; determine, based upon information included in the received message, a start time for a current operation cycle of the at least one Fieldbus device; and determine, based upon the start time and a duration of the current operation cycle, a specific time at which control functionality for the at least one Fieldbus device will be executed such that a control message output by the at least one processor will be received by the at least one Fieldbus device within the current operation cycle.

According to another embodiment of the invention, there is disclosed a method for synchronizing control of Fieldbus devices. A controller that includes one or more computers may receive operating information associated with at least one Fieldbus device in direct or indirect communication with a controller. Information associated with a current operation cycle of the at least one Fieldbus device may be identified by the controller. Based upon the information associated with the current operation cycle, the controller may determine a specific time at which the controller will process the received operating information. Upon reaching the determined specific time, the controller may process the received operating information. The controller may then output at least one control message for communication to the at least one Fieldbus device during the current operation cycle.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
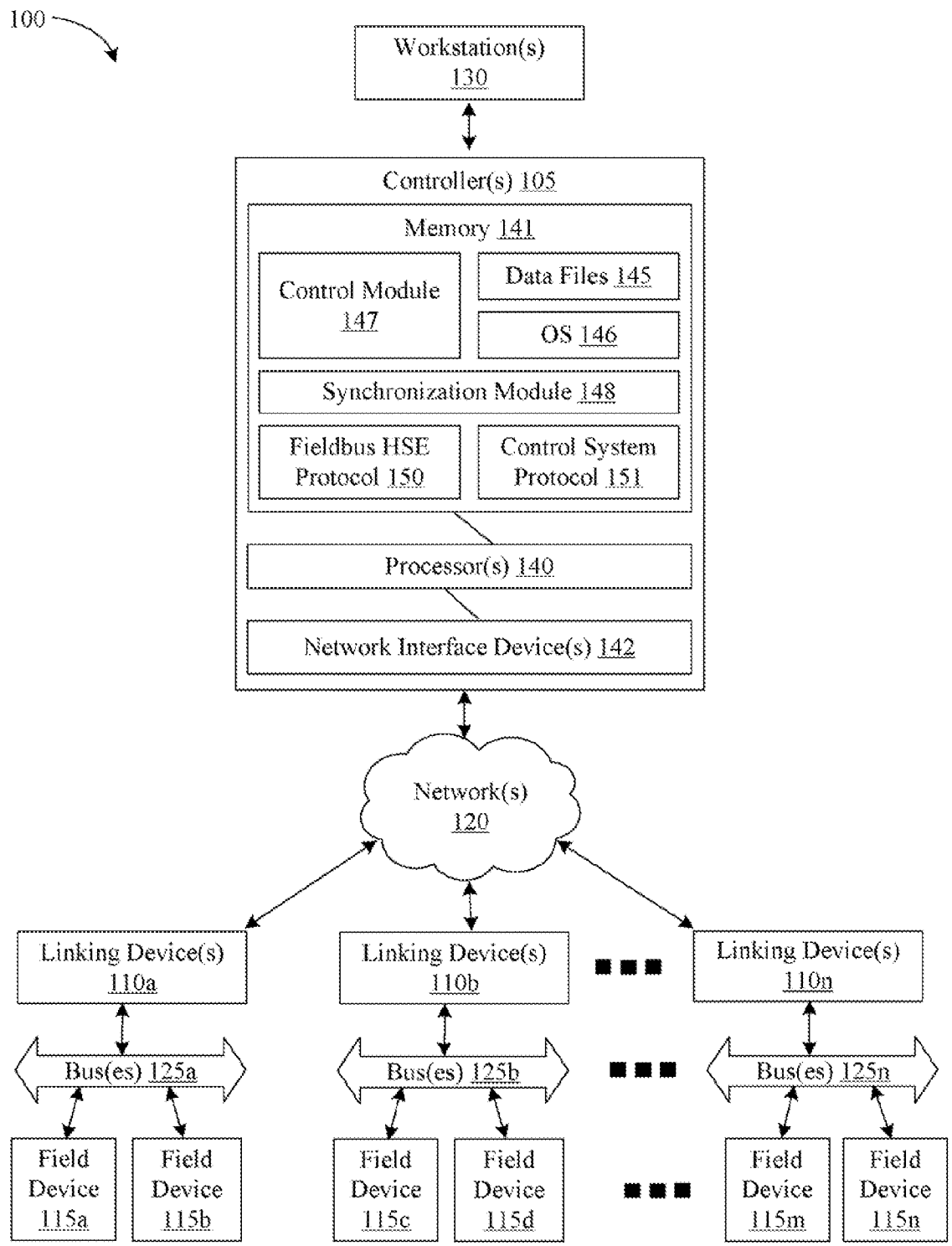

Having thus described the invention in general terms, reference will now be made to the accompanying drawings, which are not necessarily drawn to scale, and wherein:

FIG. 1 is a schematic diagram of one example control system that may be utilized in accordance with various embodiments of the invention.

Figure 2:
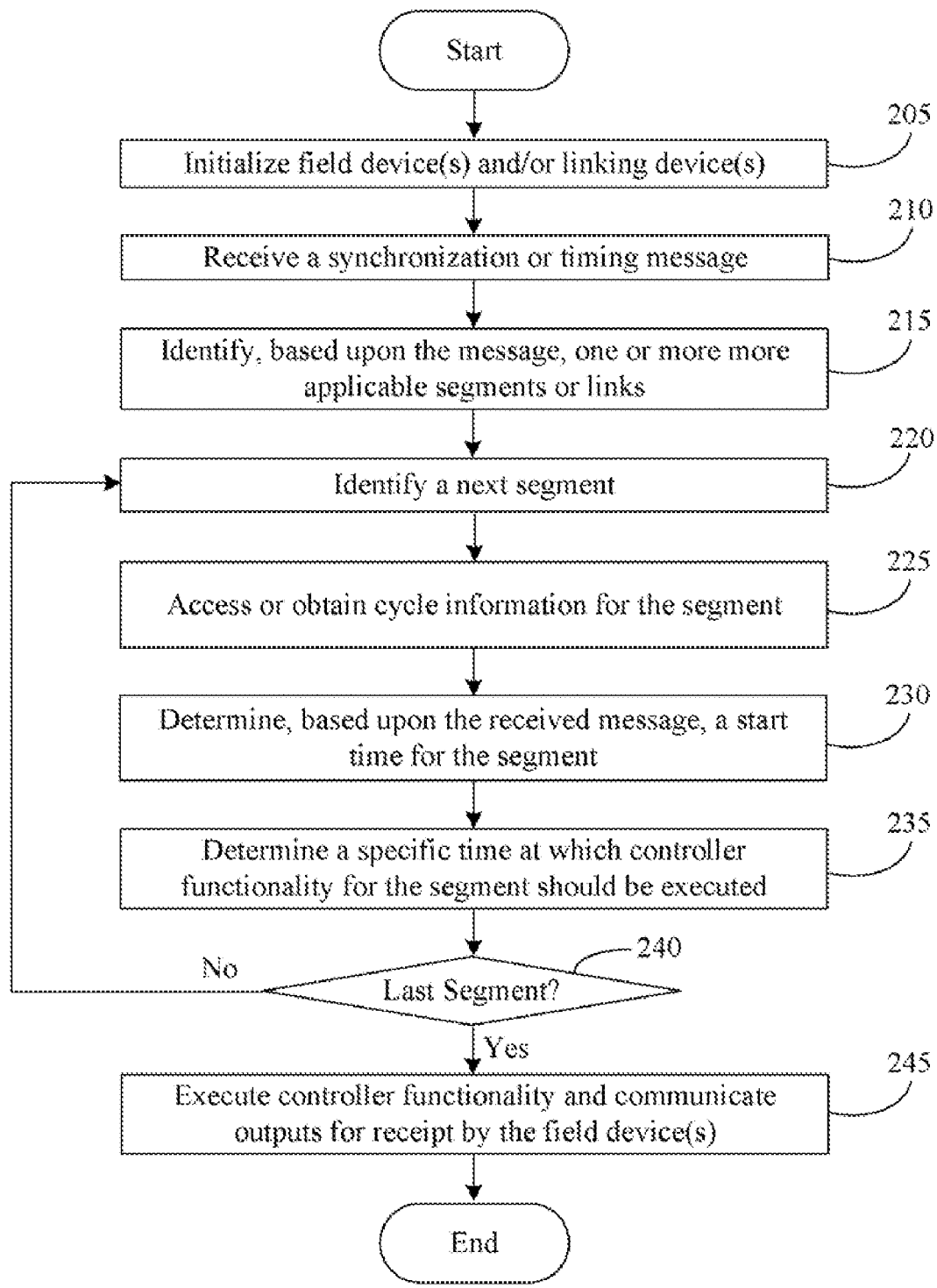

FIG. 2 is a flow chart of one example method for synchronizing Fieldbus devices and an external control system, according to an illustrative embodiment of the invention.

Figure 3:
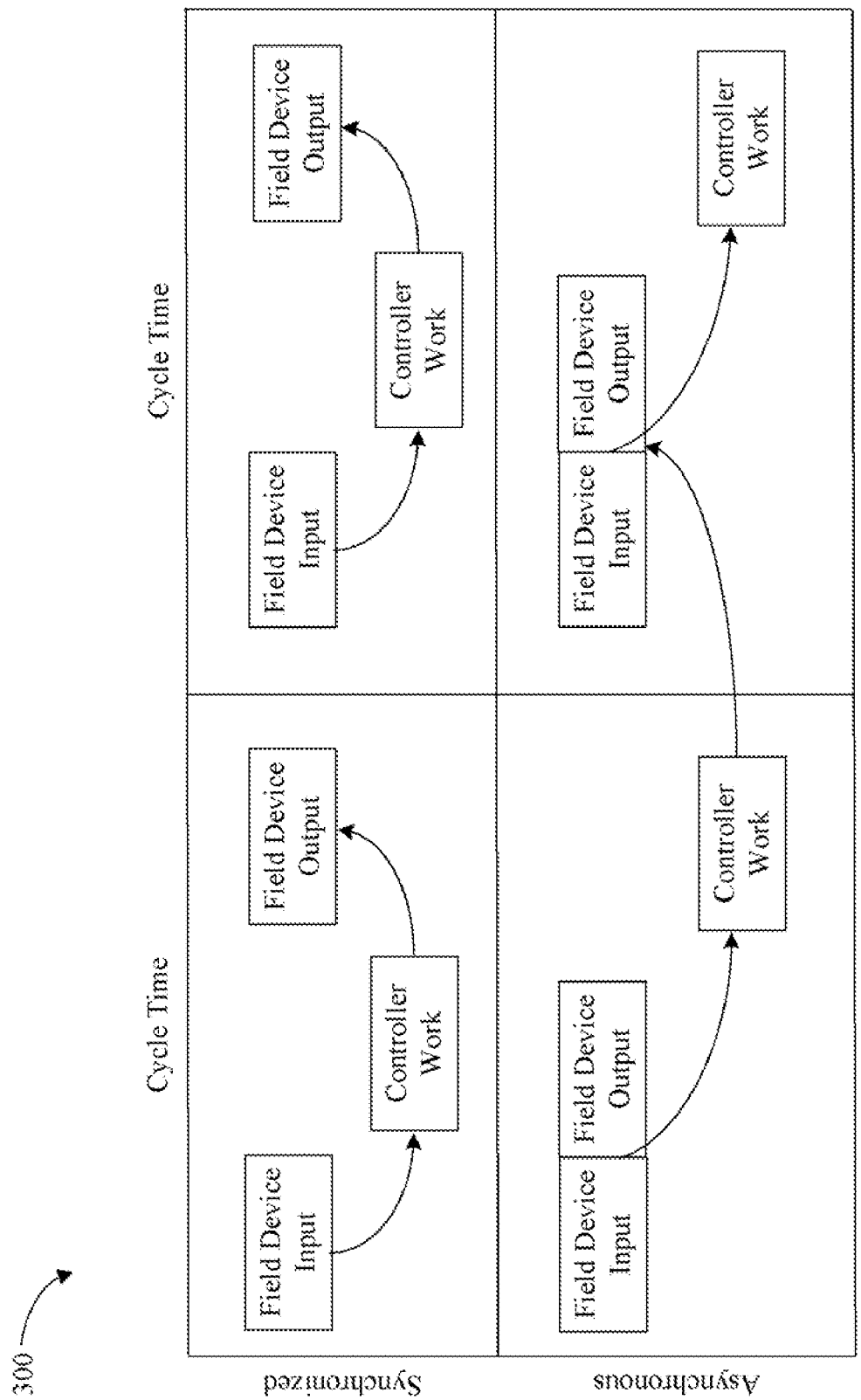

FIG. 3 is an illustration of one example synchronization that may be achieved in accordance with various embodiments of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for synchronizing the control of Fieldbus devices within a control system. More specifically, systems and methods for the synchronization of an external controller or control system with one or more Fieldbus devices are disclosed. A controller and any number of Fieldbus devices may be provided. The controller may be in direct or indirect communication with each Fieldbus device. For example, the controller may communicate with one or more Fieldbus devices via one or more suitable linking devices. In operation, a controller may receive a message including timing information for at least one Fieldbus device. For example, the controller may receive a message from a linking device. Based upon information included in the received message, such as current timing information for one or more segments associated with a linking device, the controller may determine a start time for a current operation cycle (e.g., a current macrocycle) of a Fieldbus device or group of Fieldbus devices. The controller may additionally identify or determine a duration of the current operation cycle, for example, by accessing duration information from a suitable memory device. Based upon the start time and duration of the operation cycle, the controller may determine a specific time or a point in time at which the controller will execute control functionality for the Fieldbus device or group of devices. For example, the controller may determine an offset from a current time. Once the determined specific time is reached, the controller may process any inputs received from the Fieldbus device(s) and/or perform other control processing for the Fieldbus device(s). The controller may then output any number of control messages and/or data for communication to the Fieldbus device(s). According to an aspect of the invention, the output messages may be received by the Fieldbus device(s) within the current operation cycle of the device(s). In this regard, the controller and the Fieldbus device(s) may be synchronized.

Various embodiments of the invention may include one or more special purpose computers, systems, and/or particular machines that facilitate the synchronization of Fieldbus devices and an external controller or control system. A special purpose computer or particular machine may include a wide variety of different software modules as desired in various embodiments. As explained in greater detail below, in certain embodiments, these various software components may be utilized to process timing information associated with Fieldbus devices and to synchronize an external controller and the Fieldbus devices.

Certain embodiments of the invention described herein may have the technical effect of facilitating the synchronization of Fieldbus devices and an external controller or control system. Additionally, certain embodiments of the invention may have the technical effect of processing data received from a Fieldbus device, performing control functionality for the Fieldbus device, and outputting one or more control messages to the Fieldbus device within a single operation cycle or macrocycle of the Fieldbus device. In this regard, the operations of the Fieldbus device and an external controller may be synchronized.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet (HSE) devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a central controller of the control system. Additionally, the term HSE protocol may be utilized to refer to a Fieldbus protocol that facilitates communications with HSE Fieldbus devices.

Communications between Fieldbus devices and/or between one or more controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

FIG. 1 is a block diagram of one example control system 100 that may be utilized in accordance with various embodiments of the invention. The control system 100 may include one or more controllers 105 (e.g., central controllers) and/or control devices, one or more linking devices 110*a-n*, and/or one or more Fieldbus devices 115*a-n*. The controller 105 may communicate with the linking devices 110*a-n* via one or more suitable networks 120 or communications buses. Additionally, the linking devices 110*a-n* may communicate with the various Fieldbus devices 115*a-n* via one or more suitable buses 125*a-n* or networks.

As desired, any number of linking devices 110*a-n* may be utilized in association with the control system 100. The linking devices 110*a-n* may be devices that are capable of communicating via a Fieldbus network or bus and via one or more relatively higher speed networks that facilitate communications with the controller 105. For example, a linking device (generally referred to as linking device 110) may be a HSE Fieldbus device or a combination HSE/H1 device. As such, the linking device 110 may be capable of communicating with the controller 105 via a suitable Ethernet network or other suitable network. Additionally, the linking device 110 may be capable of communicating with connected Fieldbus devices 115*a-n* via one or more Fieldbus networks and/or data buses. As desired, the linking devices 110*a-n* may facilitate communication between the controller 105 and the Fieldbus devices 115*a-n*. Alternatively, in other embodiments, a Fieldbus device 115 may be in direct communication with the controller 105 via a suitable network 120 or bus 125.

A linking device 110 may include any number of segments and/or connections to which a Fieldbus data bus 125 or local Fieldbus network may be connected. For example, in certain embodiments, a linking device 110 may include four (4) segments, although any other number of segments may be included as desired. Each segment may establish a separate communications channel and be configured to facilitate communications between the linking device 110 and the Fieldbus devices connected to the segment.

In operation, a linking device 110 may be configured to transmit or communicate a message including timing information to the controller 105. In certain embodiments, a message may be periodically communicated. The period for the communications may be a default time period or a period that is established by one or more user preferences. Additionally, a wide variety of suitable time periods may be utilized as desired, such as a period of approximately five hundred (500)

milliseconds. In other embodiments, a message may be communicated to a controller 105 in response to a request for the message. According to an aspect of the invention, a communicated message may include timing information associated with the segments of the linking device 110 and/or the Fieldbus devices connected to the segment. For example, a message may include a current operation time of the segment and/or connected Fieldbus device within a current macrocycle or other operation cycle. As desired, the message may include a wide variety of additional information, such as a duration of the operation cycle. As an alternative to receiving a message from a linking device 110, a message may be received directly from a Fieldbus device 115 in certain embodiments of the invention.

With continued reference to FIG. 1, any number of Fieldbus devices 115*a-n* may be utilized in association with the control system 100. In certain embodiments, each Fieldbus device (generally referred to as device 115) may be in communication with a linking device 110 via a local Fieldbus network or data bus 125. In this regard, communications between the Fieldbus device 115 and the controller 105 may be facilitated by the linking device 110. In other embodiments, a Fieldbus device 110 may be in direct communication with a controller 105. A wide variety of different types of Fieldbus devices may be utilized as desired in various embodiments of the invention, including any number of H1 Fieldbus devices and/or other suitable devices. In certain embodiments, the Fieldbus devices 115*a-n* may be distributed or situated at varying points within a power plant or process plant. In this regard, the Fieldbus devices 115*a-n* may be utilized to monitor and/or control various aspects and/or operations of a plant.

In certain embodiments, communications between the linking devices 110*a-n* and the Fieldbus devices 115*a-n* may be facilitated using the Fieldbus protocol. Additionally, communications between the linking devices 110*a-n* and the controller 105 may be facilitated using the Fieldbus protocol.

According to an aspect of the invention, a segment of a linking device 110 and the Fieldbus devices connected to that segment may be configured to operate in accordance with an operation cycle, such as a Fieldbus macrocycle. For example, a Fieldbus macrocycle may define a total execution time for the logic within a segment. In certain embodiments, the duration or length of the operation cycle may be configured or set by a user or technician. In other embodiments, the duration of the operation cycle may be dynamically determined and/or established. As desired, a minimum duration of the operation cycle may be defined based at least in part on a latency and/or operation speed of a slowest device connected to the segment. As an alternative to establishing an operation cycle for a segment of a linking device 110, an operation cycle may be established for an individual Fieldbus device or group of Fieldbus devices in a similar manner.

Any number of operation cycles may be established as desired in various embodiments of the invention. For example, a respective operation cycle may be established for each segment of each linking device 110*a-n*. In certain embodiments, once a duration of an established operation cycle has been established or determined, the duration may be communicated to and/or stored by the controller 105.

In certain embodiments, a Fieldbus device 115 connected to a segment (or directly connected to the controller 105) may be operable or configured to communicate measurements data, events data, and/or any other suitable data associated with the operation of the Fieldbus device 115 to the controller 105. According to an aspect of the invention, the Fieldbus device 115 may be configured to output data during the relevant operation cycle such that the data may be received and processed by the controller 105 during the same operation cycle. Additionally, the data may be output such that any control signals or other messages associated with the processing of the data by the controller 105 may be received by the Fieldbus device 115 during the operation cycle. In this regard, the operations of the Fieldbus device 115 and the controller 105 may be synchronized.

With continued reference to FIG. 1, the one or more illustrated networks 120 may include any suitable network or combination of networks that facilitate communications between the linking devices 110*a-n* and the controller 105. Similarly, the Fieldbus data buses 125*a-n* or networks may include any number of suitable data buses and/or local area networks that facilitate communication between a linking device 110 and Fieldbus devices that are connected to the linking device 110. Examples of suitable networks and/or data buses include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network 120. Each of the Ethernet switches may include hardware and/or software components that are operable to facilitate the routing of data within the network 120. Examples of suitable Ethernet switches include, but are not limited to, network bridges, multilayer switches, etc.

As desired in various embodiments of the invention, redundant components may be provided within the network 120 and/or the system 100. For example, redundant wiring, switches, and/or routers may be provided. Additionally, in certain embodiments redundant linking devices 110*a-n* and/or segments may be provided. In this regard, adequate operations may be maintained within the control system 100 in the event of failure of network device.

With continued reference to FIG. 1, the control system 100 may include a controller 105, such as a central controller. Some examples of suitable controllers are a Mark™ VI control system and a Mark™ Vie control system produced by the General Electric Company. The controller 105 may be configured to communicate with and/or control other components of the control system 100 and/or components of the plant or system that is controlled by the control system 100. Additionally, the controller 105 may be configured to receive data associated with the operation of the Fieldbus devices 115*a-n* and/or the linking devices 110*a-n*, to process at least a portion of the received data, and/or to output one or more control signals or other messages for receipt by any number of linking devices 110*a-n* and/or Fieldbus devices 115*a-n*. According to an aspect of the invention, the controller 105 may determine one or more specific times at which received data associated with the operation of the Fieldbus devices 115*a-n* will be processed in order to facilitate synchronization of the Fieldbus devices 115*a-n* and the controller 105.

The controller 105 may include any number of processor driven devices that control the operations of the control system 100. For example, the controller 105 may include any number of special purpose computers or particular machines, application specific circuits, programmable logic controllers (PLC), microcontrollers, personal computers, minicomputers, mainframe computers, supercomputers, and the like. In certain embodiments, the operations of the controller 105 may be controlled by computer-executed or computer-implemented instructions that are executed by one or more processors associated with the controller 105. The instructions may be embodied in one or more software components as desired in various embodiments of the invention. The execution of the instructions may form a special purpose computer or other particular machine that is operable to control the operations of the control system 100 and/or to facilitate the synchronization of the controller 105 with the Fieldbus devices 115*a-n*. The one or more processors that control the operations of the controller 105 may be incorporated into the controller 105 and/or in communication with the controller 105 via one or more suitable networks. In certain embodiments of the invention, the operations and/or control of the controller 105 may be distributed amongst several processing components.

The controller 105 may include one or more processors 140, one or more memory devices 141, and one or more network interface device(s) 142. The one or more memory devices 141 may be any suitable memory devices, for example, caches, read only memory devices, random access memory devices, magnetic storage devices, etc. The one or more memory devices 141 may store data, executable instructions, and/or various program modules utilized by the controller 105, for example, data 145 associated with the operation of the control system, linking devices 110*a-n*, and/or Fieldbus devices 115*a-n*, an operating system 146, a control module 147, and a synchronization module 148. Additionally, the memory 141 may be operable to store a Fieldbus or HSE protocol 150 and/or a second control system protocol 151 that facilitates communication with other components of the control system 100, such as one or more workstations 130 at which an operator may be presented with information associated with the control system operation and/or enter user commands. The data 145 may include any suitable data associated with the operation of the control system 100 and/or the operation of the plant or system monitored by the control system 100, for example, measurements data, operating data, data associated with the operation of one or more linking devices 110*a-n*, data associated with the operation of one or more Fieldbus devices 115*a-n*, data associated with one or more operation cycles or macrocycles for the linking devices 110*a-n* and/or Fieldbus devices 115*a-n*, etc. The operating system (OS) 146 may include executable instructions and/or program modules that facilitate and/or control the general operation of the central controller 105. For example, the OS 146 may facilitate the execution of other software programs and/or program modules by the processors 140.

The control module 147 may be operable to monitor and/or control the overall operations of the control system 100 and/or the plant or system that is monitored and/or controlled by the control system 100. In doing so, the control module 147 may utilize various measurements and/or other data associated with the operation of the control system 100 and/or the monitored plant or system. At least a portion of the utilized data may be received from the Fieldbus devices 115*a-n* either directly or via the linking devices 110*a-n*. The control module 147 may be further operable to generate command signals associated with the operation of the control system 100 and to direct the communication of the generated signals to other components of the control system 100, for example, to the Fieldbus devices 115*a-n*. For example, the control module 147 may be operable or configured to process data received from one or more Fieldbus devices 115*a-n* and direct the communication of generated control signals or other messages to the Fieldbus devices 115*a-n*.

As desired, a communications module may be associated with the controller 105 and operable to format and/or generate communications to be transmitted over the network 120. Additionally, the communications module may be operable to receive communications that have been transmitted to the central controller 105 and to extract data from the received communications. The communications module may utilize both the Fieldbus or HSE protocol 150 and/or one or more other protocols, such as the control system or second protocol 151, during the formatting of communications.

The synchronization module 148 may be operable to or configured to synchronize the operations and/or processing of the controller 105 and the Fieldbus devices 115*a-n*. According to an aspect of this invention, the synchronization module 148 may identify one or more specific times at which the controller 105 will execute control functionality and/or processing for one or more respective Fieldbus devices and/or groups of Fieldbus devices such that control signals and other messages generated and/or output by the controller 105 will be received by the Fieldbus devices within one or more relevant current operation cycles of the Fieldbus devices.

In one example embodiment, the synchronization module 148 may receive timing information associated with a Fieldbus device 115 or a group of Fieldbus devices, such as a group of Fieldbus devices that are connected to the same segment of a linking device 110 or to a same data bus 125. A wide variety of timing information may be received as desired in various embodiments of the invention. In one example embodiment, information associated with a current time within a current operation cycle or macrocycle may be received. In another example embodiment, information associated with a start time for a current operation cycle may be received. In certain embodiments, the timing information may be received in a synchronization message or a timing message that is output by a linking device 110 or a Fieldbus device 115. For example, a linking device 110 may output a timing or synchronization message that includes respective timing information for each of the segments of the linking device 110. As desired in certain embodiments, a timing or synchronization message may be periodically output for receipt by the controller 105. In other words, a linking device 110 or Fieldbus device 115 may be configured to periodically output timing data at a predetermined interval or time. For example, timing data may be output at or near the start of an operation cycle or macrocycle for receipt by the controller 105.

Once timing information is received for a segment or Fieldbus device 115, the synchronization module 148 may utilize the timing information in order to determine a start time of a current operation cycle associated with the segment or device 115. For example, the synchronization module 148 may determine a start time of the current operation cycle by subtracting a timing value included in the timing information (e.g., a value representing a current time within the operation cycle) and, as desired, an estimated network delay time, from a current time (e.g., a clock time) associated with the controller 105. Additionally, the synchronization module 148 may access or obtain information associated with the operation cycle of the segment or device 115, such as a duration of the operation cycle. For example, the synchronization module 148 may access duration data from a suitable memory associated with the controller 105. As another example, the synchronization module 148 may identify duration information that is included in the received timing information and/or in another received message.

Once a start time for the operation cycle is determined, the synchronization module 148 may utilize the determined start time and the duration information for the operation cycle in order to determine a specific time at which controller functionality should be executed by the control module 147 for the segment or Fieldbus device 115. For example, a timing offset for executing controller functionality or a specific clock value at which controller functionality should be executed may be determined. The determined specific time may be a time at which control operations for the segment or device 115 will be performed such that any control signals or other messages output by the controller 105 will be received by the Fieldbus device 115, the segment, and/or any devices connected to the segment within the current operation cycle. In this regard, the operations of the controller 105 and connected Fieldbus devices 115a-n may be synchronized. Additionally, any differences between the operating rates of the controller 105 and the connected Fieldbus devices 115a-n may be taken into account. Once the determined specific time is reached, the control module 147 may execute controller functionality for the Fieldbus device 115, the segment, and/or any devices connected to the segment. In doing so, the control module 147 may process any inputs that are received from the segment and/or Fieldbus device 115 (e.g., measurements data, event data, etc.) and/or generate any number of suitable control signals and/or other messages for output to the Fieldbus device 115, the segment, and/or any devices connected to the segment. The control module 147 may then direct the communication of any generated signals and/or messages to designated recipients.

An example of the operations that may be performed by the synchronization module 148 to synchronize the controller 105 and the Fieldbus devices 115a-n is set forth in greater detail below with reference to FIG. 2.

With continued reference to FIG. 1, the network interface devices 144 may facilitate connection of the controller 105 to the network 120 and/or to the workstations 130. The network interface devices 144 may include any number of input/output cards (e.g., Ethernet cards) and/or other devices that facilitate network communications.

In certain embodiments of the invention, one or more workstations 130 may be provided. As desired, these workstations 130 may provide a human machine interface (HMI) between the control system 100 and one or more operators of the control system 100. For example, the workstations 130 may facilitate the receipt of user input and/or user commands associated with the operation of the control system 100. In other words, the workstations 130 may facilitate user interaction with the controller 105. Additionally, the workstations 130 may be configured to receive data from the controller 105, such as presentations associated with the connected Fieldbus devices 115a-n. The workstations 130 may further be configured to display at least a portion of the received data to a user via a suitable display device, such as a monitor.

The workstations 130 may include one or more suitable computers or computing devices, such as personal computers, hand-held computing devices, mini-computers, etc. Additionally, the workstations 130 may be in communication with the controller 105 via one or more suitable network connections, for example, a direct link or direct connection, a local area network, a wide area network, the Internet, a radio frequency (RF) network, a Bluetooth™ enabled network, any suitable wired network, or any suitable wireless network. In this regard, user commands, instructions, and/or other input associated with the operation of the control system 100 may be received by the workstations 130 and communicated to the controller 105. Additionally, output data associated with the operations of the control system 100 and/or a plant or other system monitored by the control system 100 may be communicated to the workstations 130 by the controller 105 for output and/or display to a user.

As desired, embodiments of the invention may include a control system 100 with more or less than the components illustrated in FIG. 1. The control system 100 of FIG. 1 is provided by way of example only.

FIG. 2 is a flow chart of one example method 200 for synchronizing Fieldbus devices and an external control system, according to an illustrative embodiment of the invention. The method 200 may be performed by a suitable controller associated with a control system, such as the controller 105 associated with the control system 100 of FIG. 1. The method may begin at block 205.

At block 205, any number of Fieldbus devices and/or linking devices, such as the Fieldbus devices 115a-n and/or linking devices 110a-n illustrated in FIG. 1, may be initialized. Additionally, communications between the Fieldbus devices 115a-n and/or linking devices 110a-n and the controller 105 may be established.

At block 210, a timing message or synchronization message may be received. For example, a timing message may be received from a linking device 110 that includes timing information for one or more segments associated with the linking device 110. As another example, a timing message may be directly received from an applicable Fieldbus device 115. Although certain embodiments of the invention may include one or more Fieldbus devices that are in direct communication with a controller 105, the remainder of the method 200 of FIG. 2 will be described in association with Fieldbus devices that are in communication with the controller 105 via a linking device 105. A wide variety of timing information may be received as desired in various embodiments of the invention, such as a start time for a current operation cycle of a segment or Fieldbus device 115 or a current time within a current operation cycle.

At block 215, one or more applicable segments or links associated with the linking device 110 may be identified based upon the information included in the received timing message. For example, one or more segments of the linking device 110 that are activated and/or to which at least one Fieldbus device is connected may be identified. Operations may then continue at block 220 and a next segment may be identified for processing.

At block 225, operation cycle information for the segment may be accessed or otherwise obtained. For example, operation cycle information may be accessed from memory or obtained from an external data source. As another example, operation cycle information for the segment may be identified or parsed from the received timing message and/or another received message. A wide variety of information associated with the operation cycle for the segment may be accessed or obtained, such as a duration or length of the operation cycle for the segment.

At block 230, a start time for the current operation cycle of the segment may be determined or identified based upon the information included in the received timing message. For example, a start time of the current operation cycle may be determined by subtracting a timing value included in the timing message (e.g., a value representing a current time within the operation cycle) and, as desired, an estimated network delay time, from a current time (e.g., a clock time) associated with the controller 105. As another example, a start time of the current operation cycle may be determined by identifying start time information included in the timing message.

At block 235, the determined start time and the duration information for the operation cycle may be utilized in order to determine a specific time at which controller functionality should be executed by the controller 105 for the segment and/or Fieldbus devices connected to the segment. For example, a timing offset for executing controller functionality or a specific clock value at which controller functionality should be executed may be determined. The determined specific time may be a time at which control operations for the segment and/or devices will be performed such that any control signals or other messages output by the controller 105 will be received by the segment and/or devices connected to the segment within the current operation cycle or the current macrocycle. In this regard, the operations of the controller 105 and the segment may be synchronized.

At block 240, a determination may be made as to whether the current segment is the last available segment. If it is determined at block 240 that the segment is not the last available segment for the linking device 110, then operation may continue at block 220 and a next segment may be identified for processing. If, however, it is determined at block 240 that the current segment is the last available segment, then operations may continue at block 245.

At block 245, controller functionality for the segments and/or connected Fieldbus devices may be executed. For example, once the determined specific time for a segment is reached, the controller 105 may execute controller functionality for the segment and/or any devices connected to the segment. In doing so, the controller 105 may process any inputs that are received from the segment and/or connected Fieldbus devices (e.g., measurements data, event data, etc.) and/or generate any number of suitable control signals and/or other messages for output to the segment and/or connected Fieldbus devices. The controller 105 may then direct the communication of any generated signals and/or messages to designated recipients.

The method 200 may end following block 245.

Although the method 200 set forth in FIG. 2 describes an iterative method for processing segments associated with a linking device 110 and synchronizing the controller 105 with each segment, in certain embodiments, one or more segments may be processed in parallel. Additionally, as desired, the method 200 may be utilized in association with any number of linking devices.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

FIG. 3 is an illustration 300 of one example synchronization that may be achieved in accordance with various embodiments of the invention. As illustrated in FIG. 3, embodiment of the invention may facilitate the synchronization of an external controller, such as the controller 105 illustrated in FIG. 1, and a connected Fieldbus device, such as a Fieldbus device 115 illustrated in FIG. 1. By synchronizing a Fieldbus device 115 and the controller, inputs may be received from the Fieldbus device 115 and processed by the controller 105 such that outputs may be communicated by the controller 105 to the Fieldbus device 115 and received by the Fieldbus device 115 within a single operation cycle or macrocycle. In this regard, proper timing between the functionality of the controller 105 and the functionality of the Fieldbus device 115 may be provided.

In contrast, in an asynchronous timing method (also illustrated in FIG. 3), a controller may execute control functionality for a Fieldbus device at a point in time such that any output control messages or signals are not received by the Fieldbus device within the same operation cycle. As a result, the Fieldbus device may not receive desired inputs prior to executing its own functionality, thereby leading to timing errors and/or data errors between the Fieldbus device and the controller. In some cases, a controller may operate at up to two operation cycles or macrocycles behind the connected Fieldbus device. By synchronizing the controller and Fieldbus device in accordance with various embodiments of the invention, these timing errors may be reduced or eliminated.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for synchronizing control of Fieldbus devices, the method comprising:
   receiving, by a controller comprising one or more computers, a message comprising timing information for at least one Fieldbus device in direct or indirect communication with the controller;
   determining, by the controller and based upon information included in the received message, a start time for a current operation cycle of the at least one Fieldbus device; and
   determining, by the controller and based upon the start time and a duration of the current operation cycle, a specific time at which the controller will execute control functionality for the at least one Fieldbus device such that a control message output by the controller will be received by the at least one Fieldbus device within the current operation cycle.

2. The method of claim 1, wherein determining a start time for a current operation cycle comprises:
   determining, based upon the information included in the received message, a current operation time of the at least one Fieldbus device; and
   determining the start time based upon the current operation time.

3. The method of claim 1, wherein receiving a message comprising timing information comprises receiving the message from a linking device that is configured to facilitate communications between the at least one Fieldbus device and the controller.

4. The method of claim 3, further comprising:
   identifying, by the controller, a segment associated with the linking device to which the at least one Fieldbus device is connected,
   wherein determining a start time for a current operation cycle comprises determining a start time for a current operation cycle of the identified segment.

5. The method of claim 3, wherein the specific time comprises a first specific time and the segment comprises a first of a plurality of segments associated with the linking device, and further comprising:
   identifying, by the controller, a second segment associated with the linking device;
   determining, by the controller based upon the information included in the received message, a start time for the current operation cycle of the second segment; and
   determining, by the controller and based upon the start time for the second segment and a duration of the current operation cycle of the second segment, a second specific time at which the controller will execute control functionality for one or more Fieldbus devices connected to the second segment.

6. The method of claim 1, further comprising:
   accessing, by the controller from an associated memory, information associated with the duration of the current operation cycle.

7. The method of claim 1, further comprising:
   receiving, by the controller as one or more inputs, operating information that is output by the at least one Fieldbus device,
   wherein the received operating information is utilized by the controller during the execution of the control functionality for the at least one Fieldbus device.

8. The method of claim 1, further comprising:
   executing, by the controller, the control functionality for the at least one Fieldbus device; and
   outputting, by the controller, at least one control message for communication to the at least one Fieldbus device.

9. A control system comprising:
   at least one memory operable to store computer-executable instructions; and
   at least one processor configured to access the at least one memory and execute the computer-executable instructions to:
      receive a message comprising timing information for at least one Fieldbus device in direct or indirect communication with the processor;
      determine, based upon information included in the received message, a start time for a current operation cycle of the at least one Fieldbus device; and
      determine, based upon the start time and a duration of the current operation cycle, a specific time at which control functionality for the at least one Fieldbus device will be executed such that a control message output by the at least one processor will be received by the at least one Fieldbus device within the current operation cycle.

10. The control system of claim 9, wherein the at least one processor is configured to determine the start time for the current operation cycle by executing the computer-executable instructions to:
   determine, based upon the information included in the received message, a current operation time of the at least one Fieldbus device; and
   determine the start time based upon the current operation time.

11. The control system of claim 9, wherein the message is received from a linking device that is configured to facilitate communications between the at least one Fieldbus device and the at least one processor.

12. The control system of claim 11, wherein the at least one processor is further configured to execute the computer-executable instructions to:
   identify a segment associated with the linking device to which the at least one Fieldbus device is connected,
   wherein the start time comprises a start time for a current operation cycle of the identified segment.

13. The control system of claim 11, wherein the specific time comprises a first specific time, the segment comprises a first of a plurality of segments associated with the linking device, and the at least one processor is further configured to execute the computer-executable instructions to:
   identify, a second segment associated with the linking device;
   determine, based upon the information included in the received message, a start time for the current operation cycle of the second segment; and
   determine, based upon the start time for the second segment and a duration of the current operation cycle of the second segment, a second specific time at which control functionality for one or more Fieldbus devices connected to the second segment will be executed.

14. The control system of claim 9, wherein the at least one processor is further configured to execute the computer-executable instructions to:

access, from an associated memory, information associated with the duration of the current operation cycle.

15. The control system of claim 9, wherein the at least one processor is further configured to execute the computer-executable instructions to:

receive, as one or more inputs, operating information that is output by the at least one Fieldbus device, wherein the received operating information is utilized during the execution of the control functionality for the at least one Fieldbus device.

16. The control system of claim 9, wherein the at least one processor is further configured to execute the computer-executable instructions to:

execute the control functionality for the at least one Fieldbus device; and direct the communication of at least one control message to the at least one Fieldbus device.

17. A method for synchronizing control of Fieldbus devices, the method comprising:

receiving, by a controller comprising one or more computers, operating information associated with at least one Fieldbus device in direct or indirect communication with the controller;

identifying, by the controller, information associated with a current operation cycle of the at least one Fieldbus device;

determining, by the controller and based upon the information associated with the current operation cycle, a specific time at which the controller will process the received operating information; and processing, by the controller upon reaching the determined specific time, the received operating information; and outputting, by the controller, at least one control message for communication to the at least one Fieldbus device during the current operation cycle.

18. The method of claim 17, wherein identifying information associated with a current operation cycle of the at least one Fieldbus device comprises:

receiving, by the controller, a message comprising timing information for the at least one Fieldbus device; and determining, by the controller based upon information included in the received message, a start time for the current operation cycle; and determining the specific time based upon the start time.

19. The method of claim 18, wherein receiving a message comprising timing information comprises receiving the message from a linking device that is configured to facilitate communications between the at least one Fieldbus device and the controller.

20. The method of claim 17, further comprising:

accessing, by the controller from an associated memory, information associated with the duration of the current operation cycle, wherein determining a specific time at which the controller will process the received operating information comprises determining the specific time based upon the accessed duration information and a start time of the current operation cycle.

\* \* \* \* \*